(12) United States Patent
Davis et al.

(10) Patent No.: US 6,429,561 B1
(45) Date of Patent: Aug. 6, 2002

(54) MAGNETIC BEARING SYSTEM AND METHOD OF CONTROLLING MAGNETIC BEARING SYSTEM

(75) Inventors: Russell W. Davis, Melbourne; Dwight D. Back, Palm City; Gregory S. Cole, Ormond Beach, all of FL (US); John Hung, Auburn, AL (US)

(73) Assignee: Mainstream Engineering Corporation, Rockledge, FL (US)

( * ) Notice: Subject to any disclaimer, the term of this patent is extended or adjusted under 35 U.S.C. 154(b) by 27 days.

(21) Appl. No.: 09/588,474

(22) Filed: Jun. 7, 2000

(51) Int. Cl.$^7$ ................................................ H02K 7/09
(52) U.S. Cl. .................................... 310/90.5; 310/68 B
(58) Field of Search ............................ 310/90.5, 68 B; 318/607, 721

(56) References Cited

U.S. PATENT DOCUMENTS

| | | | | |
|---|---|---|---|---|
| 4,000,929 A | * | 1/1977 | Studer ........................ | 310/90.5 |
| 5,208,522 A | * | 5/1993 | Griepentrog et al. ....... | 318/611 |
| 5,471,106 A | | 11/1995 | Curtis et al. ................ | 310/90.5 |
| 5,703,424 A | | 12/1997 | Dorman ...................... | 310/90.5 |
| 5,760,510 A | * | 6/1998 | Nomura et al. ............. | 310/90.5 |
| 5,821,656 A | * | 10/1998 | Colby et al. ................ | 310/90.5 |
| 5,857,348 A | * | 1/1999 | Conry ......................... | 62/209 |
| 5,924,847 A | * | 7/1999 | Scaringe et al. ............. | 417/42 |
| 5,947,394 A | * | 9/1999 | Egan, III et al. ............ | 241/30 |
| 6,020,665 A | * | 2/2000 | Maurio et al. ............... | 310/90.5 |
| 6,023,115 A | | 2/2000 | Maejima ...................... | 310/90.5 |
| 6,043,580 A | * | 3/2000 | Vogel et al. ................. | 310/179 |
| 6,078,119 A | * | 6/2000 | Satoh et al. ................. | 310/90.5 |
| 6,111,333 A | * | 8/2000 | Takahashi et al. ........... | 310/90.5 |

FOREIGN PATENT DOCUMENTS

| | | | |
|---|---|---|---|
| EP | 0560234 | * | 9/1993 |
| JP | 04185911 | * | 2/1992 |
| JP | 08074773 | * | 3/1996 |

* cited by examiner

*Primary Examiner*—Joseph Waks
(74) *Attorney, Agent, or Firm*—Crowell & Moring LLP

(57) ABSTRACT

A method for controlling magnetic bearings is disclosed. More specifically, this method moves the rotor position setpoint away from the center point between two opposing bearings and closer to one of the bearings. Assuming the force on the rotor is unidirectional, the bearings will be more stable and will be able to exert more force on the rotor. The bearings require less current, thereby allowing for the reduction of the winding size, and the power consumption of the bearing is decreased. The movement of the shaft in one direction or the other necessitates adaptive control, or the alteration of the dynamic control algorithm to maintain optimal performance by accounting for different system stability requirements.

34 Claims, 7 Drawing Sheets

Schematic of one possible hardware configuration for the variable rotor position set point controller; 10=RPM Sensor, 11=frequency to voltage (FV) converter, 12=voltage divider, 13=New Set Point for the rotor position, 14=FV converter output that is proportional to shaft rotational speed, 15=main magnetic bearing system controller controller.

Schematic of a state of the art magnetic bearing system; 16=position sensors, 17=main controller, 13=set point signal, 18=current amplifiers, 19=rotor shaft, 20 and 21=dual set bearing pair.

Root Locus of a typical bearing system. The gain
window is created by the bearing poles, located here at
roughly ± 417 rad/s, and the low pass filter poles,
located here at roughly -354 ± j354 rad/s.

Data showing the current in the dual set pairings as a function of air gap width. At 125μm, the bias current could be reduced almost 2.5A without hitting ever zeroing out the overall bearing current. This would also reduce the other bearing's current to roughly 3A.

Schematic of one possible hardware configuration for the variable rotor position set point controller; 10=RPM Sensor, 11=frequency to voltage (FV) converter, 12=voltage divider, 13=New Set Point for the rotor position, 14=FV converter output that is proportional to shaft rotational speed, 15=main magnetic bearing system controller controller.

FIG. 5

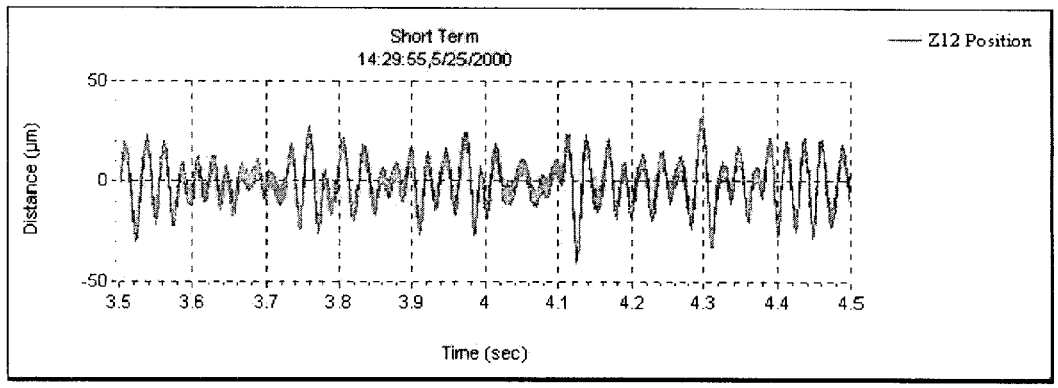

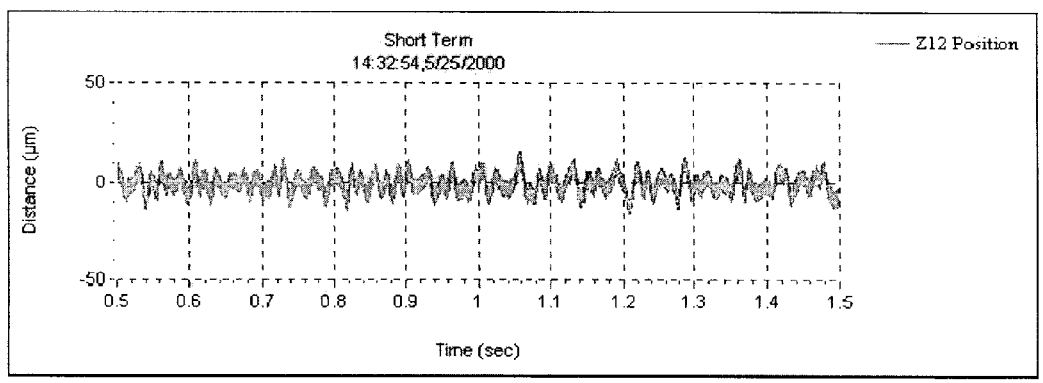

Two plots of rotor position versus time. The two plots were taken within minutes of each other under essentially identical system operating conditions. The top plot shows a rotor oscillation of 40 microns. The bottom plot, with improved gain constants, shows a rotor oscillation of less than 20 microns. The gain settings of the lower plot can not be levitated and delevitated stably, however.

(PRIOR ART)

(PRIOR ART)

MAGNETIC BEARING SYSTEM AND METHOD OF CONTROLLING MAGNETIC BEARING SYSTEM

This invention was developed under contract with the US Air Force, titled "Demonstration of a Compact High Efficiency Magnetic Bearing Chiller", contract F33615-98-C-2925, Jan. 22, 1999 through the present.

BACKGROUND AND SUMMARY OF THE INVENTION

The present invention relates to magnetic bearing systems and methods for controlling magnetic bearing systems. More specifically, this invention describes a system and a method for moving the rotor position setpoint away from the center point between two opposing bearings and closer to one of the bearings.

Magnetic bearings provide a host of advantages over traditional bearings. Chief among these are decreased frictional loss leading to increased efficiency and the possibility of increased rotational speeds and increased component life. However, the control of the magnetic bearings often proves problematic.

A typical magnetic bearing system, shown in FIG. 1, detects the position of the rotor shaft 19 using either Hall sensors or inductive sensors 16. These sensors create an output voltage that is proportional to the magnetic flux, which is inversely proportional to the air gap width between the sensors and the rotor. The position signal is sent to a main controller, which compares the position to a pre-determined setpoint 13 and emits an output current proportional to the change in the bearing current that is necessary to bring the shalt back to the setpoint. The controller output current often passes through current amplifiers 18 that then emit the correctly scaled and conditioned bearing current. In state of the art bearings, the bearings operate in groups of at least one dual-magnet pair 20 and 21. That means that as the current and therefore the force in one is increased, the current and force in the other is decreased by a similar amount. This methodology allows for twice the response of a non-dual-magnet pair. In order to enact the dual-magnet scheme, it is necessary to supply a bias current to the bearing pair. In this way, the current in each bearing can either be decreased or increased, whereas in a bearing without a bias current, no decrease is possible as the current is zero in the normal equilibrium state. It should be noted that some systems operate the bearings independently of each other in a non-dual magnet pair. In such a system, only the bearing that needs to exert the corrective force on the rotor position is activated.

In current magnetic bearing systems, the main dynamic controller typically operates using proportional-integral-derivative (PID), proportional-integral (PI), or proportional-derivative (PD) algorithms. There are many forms of the control algorithm equation, but all of them utilize the error signal, defined as the difference between the actual position and the position setpoint, along with combinations of the integral and derivative of the error signal. Each of these three components of the controller algorithm are multiplied by a separate gain that determines to what degree each term has control over the outputted correction signal. One form of the PID equation is given in Equation 1 with the transfer function given in Equation $$G(t) = K_{TG}\left[K_P e(t) + K_I \int e(t)dt + K_D \frac{d}{dt}e(t)\right] \quad [1]$$

$$G(s) = K_{TG}\left[K_P + \frac{K_I}{s} + K_D s\right] \quad [2]$$

Equation 2 is the Laplace transform of Equation 1. The Laplace transform associates one function with a simpler function of another variable. Often, this is used to switch between the time and frequency domains.

Additional filters such as low pass filters, notch filters, or lag-lead filters are sometimes employed to filter out high frequency noise and improve system stability.

Magnetic bearings are inherently unstable without dynamic control in place. One method of increasing the system stability is to decrease the bias current. However, by decreasing the bias current, the current in one of the dual-set bearings can approach zero under a lesser bearing load. Once the bearing current is at zero, the overall control of the magnetic bearings becomes highly non-linear because the system has effectively switched from utilizing a dual-magnet pair of bearings to utilizing only single independent bearings. Therefore, it would be preferable to use a method that decreases the bias current to increase system stability while maintaining both bearing currents above zero.

Additionally, different PID, PI, PD and filter constants are desirable for the dynamic controller for start-up and run situations. Start-up involves a large sudden transient as the bearing is levitated. Therefore, a set of parameters that can handle a large transient is needed. However, during operation, a different set of tuning parameters may be desirable in order to better track the steady-state disturbances in the system and thereby achieve better control over the bearings. These two sets of parameters may be very different, so a method of switching between two controller settings would be very beneficial.

In addition to the standard PD, PI, and PID control algorithms, over the past ten years, researchers have investigated several nonlinear control methods for magnetic suspension systems, including magnetic bearings. One technique is based on nonlinear feedback linearization, which gives excellent performance, but requires an accurate nonlinear design model as well as a central processing unit (CPU) capable of computing the nonlinear control algorithm. Variable structure control methods have also been investigated, but these methods are not suitable for use with current amplifiers because the control output is a high frequency switching signal. Many nonlinear controllers cannot be retrofit to commercial magnetic bearing systems, which are set up for PID-type control. Hence, a control system with improved stability based on linear models would be highly advantageous.

U.S. Pat. No. 6,023,115 uses a series of short duration voltage pulses to increase the force in radial electromagnets at several points during start-up as a means of preventing dragging in motors at their resonant frequencies. However, this does not provide steady-state position variation improvement and the added bias current may decrease the stability of the system.

U.S. Pat. No. 5,760,510 uses a CPU to determine the frequency spectrum of the position oscillations and then outputs a current to create a magnetic flux that counters each separate frequency component, but the position displacement is something that he seeks to eliminate.

U.S. Pat. No. 5,703,424 details a method of correcting for air gap fluctuations that occur in the natural operation of the system. The inventors do this partially by reducing the bias current. However, though he realizes the importance of reducing the bias current for increased stability, he does not provide for a means of reducing the bias current below the natural limit of the bearing system.

U.S. Pat. No. 5,471,106 uses the variable flux that results from the natural movement of the rotor during normal operation as an input in the determination of a current that will reject disturbances of varying frequencies, but the position displacement is again something the inventors seek to eliminate.

The above inventions all assume a central position for the rotor equidistant between two dual-magnet bearings, and they all vary the current as a means of producing the variable flux and hence the variable force on the rotor necessary to maintain that central position. However, a controller that varied the rotor position setpoint is a means of varying the flux and force would have several advantages, assuming the rotor was under a unidirectional load. First, since force is related directly to current and inversely to the air gap width, for a constant current a smaller air gap would produce a greater force. Thus, if a non-central position is used, a bearing magnet could produce a greater force than the force it was designed for. Secondly, given a constant force, a smaller air gap would require a smaller current. This would mean that smaller windings could be used in the bearing magnets. Third, as the current would increase in the opposing bearing, i.e. the bearing that would now see a larger air gap, the bias current could be lowered without allowing the opposing bearing current to dip to zero. A lower bias current would still further reduce the current in the first bearing while also increasing the stability of the system. Finally, the reduction in the current of both bearings caused by lowering the bias current would result in a decrease in the electrical power consumed by the bearings.

The variation of bias current and rotor set point in a dual-magnet bearing also has consequences for the controller. In particular, these variations may require an adaptive control process to re-optimize the gains or other linear PID, PI, or PD controller constants so as to maintain the optimal performance of the magnetic bearing system after the rotor has been moved from its central location. Hence, the advantages of varying the bias current and offset can only be fully realized by implementing an adaptive control.

Therefore, in light of the benefits of a variable position offset controller, as well as the aforementioned shortcomings in the prior art, this invention has the following objectives:

One object of this invention is to provide an improved method of magnetic bearing dynamic control.

A related object of this invention is to provide a means for increasing magnetic bearing stability by decreasing the bias current while simultaneously providing a means of maintaining both bearing current levels above zero.

Another object of this invention is to provide a means of increasing the force output possible for a given bearing size by varying the rotor position setpoint away from a centered position.

A fourth object of this invention is to provide a means of lowering the maximum currents in the bearing windings by offsetting the position of the shaft from the central position of a dual magnet bearing.

Another object of this invention is to provide a means of decreasing the electrical power consumption of a magnetic bearing by varying the rotor position setpoint away from a centered position.

A further object of this invention is to provide a means of enabling the reduction of the bias current by offsetting the position of the shaft from the central position of a dual magnet bearing.

Another object of this invention is to provide the design of hardware that will automatically vary the rotor position setpoint as a function of bearing current, rotor speed, or any other aerodynamic, thermodynamic, or hydrodynamic process variable.

Yet another object of this invention is to teach a magnetic bearing adaptive control method that will optimize the linear control parameters as a function of bearing current, rotor speed, or any other aerodynamic, thermodynamic, or hydrodynamic process variable.

The benefits of this are fourfold, assuming the force on the rotor is unidirectional, meaning that the force is always in the same direction, though not necessarily with the same magnitude. First, the bearings will be more stable. Secondly, the bearings will be able to exert more force on the rotor. Thirdly, the bearings will require less current, thereby allowing for the reduction of the winding size. Finally, the power consumption of the bearing will be decreased. However, the movement of the shaft in one direction or the other necessitates adaptive control, or the alteration of the dynamic control algorithm to maintain optimal performance by accounting for different system stability requirements.

BRIEF DESCRIPTION OF THE DRAWINGS

Other objects, advantages and novel features of the present invention will become apparent from the following detailed description when considered in conjunction with the accompanying drawings herein.

FIG. 5 shows two plots of rotor position versus time. The two plots were taken within minutes of each other under essentially identical system operating conditions. The top plot shows a rotor position oscillation of 40 $\mu$m. The bottom plot, with improved gain constants, shows a rotor oscillation of less than 20 $\mu$m. The PID gain settings of the lower plot do not allow for stable levitation and delevitation, however, illustrating the need for adaptive control.

DETAILED DESCRIPTION OF THE INVENTION

Figure 1:
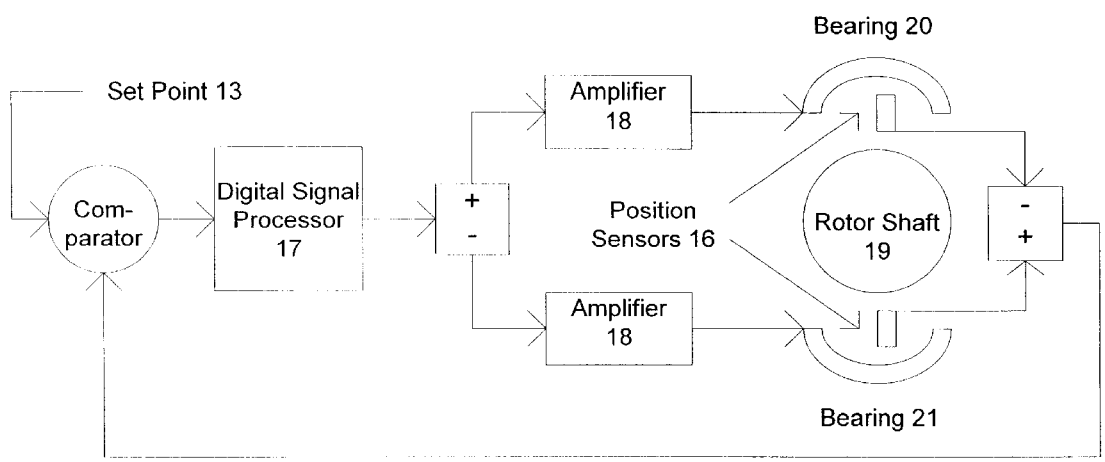
FIG. 1 is an overall schematic of a state of the art magnetic bearing system.

A typical magnetic bearing system is shown in FIG. 1. The rotor shaft 19 position is detected using either Hall sensors or inductive sensors 16 which create an output voltage proportional to the magnetic flux which is inversely proportional to the air gap between the sensors and the rotor. In state of the art bearings, the bearings operate as a dual-magnet pair 20 and 21. That means that as the current and therefore the force in one is increased, the current and force in the other is decreased by a similar amount. This methodology allows for twice the response of a non-dual-magnet pair.

According to the laws of electromagnetics, the force exerted on a magnetic body by a current-carrying coil is directly proportional to the square of the current in the coil and inversely proportional to the square of the distance between the two, as given in Equation 3.

$$F_{magnetic} \propto \frac{i_{coil}^2}{d_{gap}^2} \qquad [3]$$

Equation 3 holds for all magnetic levitation systems, including axial, radial, and conical magnetic bearings. The proportionality constant depends on the geometry and construction of the system. For example, a state of the art axial magnetic bearing would have a force equation given by Equation 4.

$$F = \frac{\mu_0 A N^2 i^2}{4 d_g^2} \qquad [4]$$

where $\mu_0$ is the permeability of free space in a vacuum, A is the pole face area, N is the number of turns in the bearing winding, i is the current in the bearing, and $d_g$ is the air gap width. In a dual-magnet bearing, the two bearing halves act against each other so the two forces must be vectorally summed to calculate the total force on the rotor. Additionally, any equation describing the force on an off-center rotor must take into account the different air gaps widths between the rotor and each of the dual-magnet bearing halves. This is easily done in a few steps by one skilled in the art (see Example 4, Equation 9).

Through a stability analysis of a typical axial magnetic bearing system, the inherent open-loop poles of an axial bearing can be shown to be;

$$X_{poles} = \pm \sqrt{\frac{\mu_0 A}{m d_g^3}} N i_{bias} \qquad [5]$$

where m is the mass of the rotor and $i_{bias}$ is the bias current. The pole in the positive half plane causes an inherent instability within the system. By closing the loop and increasing the gain in the controller, this closed-loop pole can be brought back into the negative half plane. This is easier to do if $i_{bias}$ is smaller, meaning the pole starts closer to the origin, as a lower gain will cause the system to remain stable. Again, Equation 5 assumes a centered rotor, but a similar equation for an off-centered rotor is easily derived.

The pole locations denoted by Equation 5 apply to a dual-magnet bearing with the rotor or shaft equidistant from each magnet. For the case where there is offset from a central location, the air gaps on either side of a rotor will be different and the resulting poles for the system will also vary. Using tuning methods familiar to those skilled in the art, the optimal linear controller settings, i.e., gains and other constants, can be calculated.

Typically a magnetic bearing system will include a linear controller (e.g., PID, PD, or PI) and filters (e.g., lowpass, lead, notch). The stability of a system is then determined by the poles and zeros of the transfer functions describing these devices. The transfer function for a PID controller is given by Equation 2, and the transfer function for a lowpass and lead filter, respectively, are shown below:

$$G(s) = \left[ \left(\frac{s}{\omega_n}\right)^2 + \left(\frac{2\zeta}{\omega_n}\right)s + 1 \right]^{-1} \qquad [6]$$

$$G(s) = \left[ \left(\frac{1}{2\pi f_z}\right)s + 1 \right] / \left[ \left(\frac{1}{2\pi f_p}\right)s + 1 \right] \qquad [7]$$

where $\omega_n$ is the natural frequency of a second order lowpass filter, $\zeta$ is the lowpass filter damping factor, $f_z$ is the lead filter zero frequency, and $f_p$ is the lead filter pole frequency.

Figure 2:
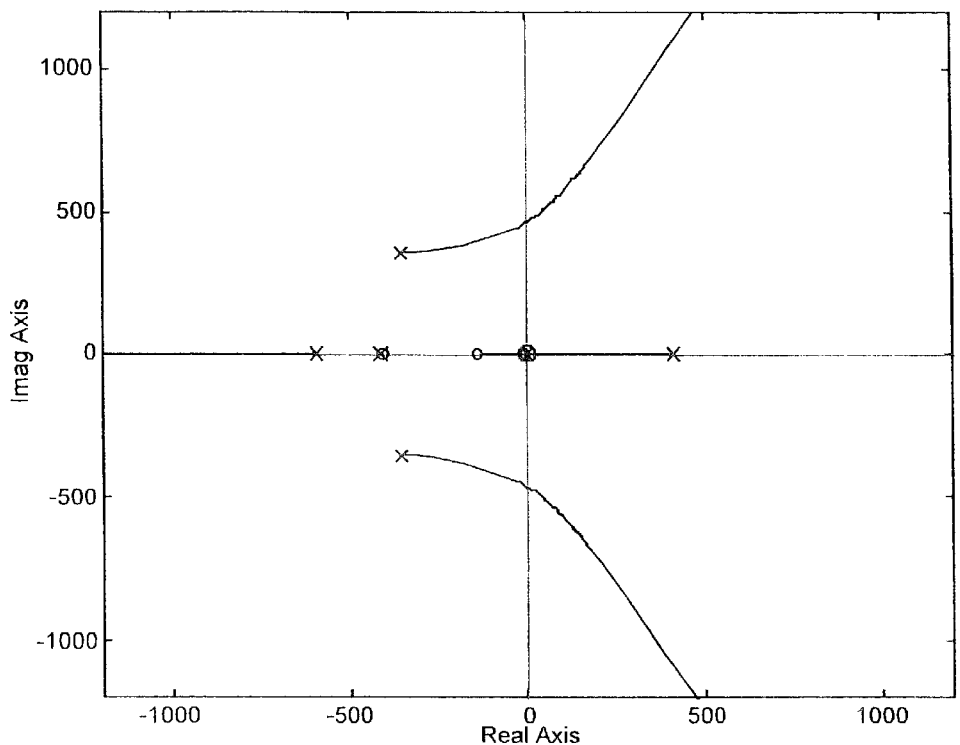
FIG. 2 shows the root locus of a typical axial magnetic bearing system. The curves show the locations of all possible closed-loop poles, generated by varying the loop gain of the system. That is, the root locus curves show the closed-loop poles as a function of control system loop gain. Note that the root locus is a function of the open-loop poles and zeroes, which are indicated by "x" and "o" marks. The real axis "x" marks roughly located at ±417 rad/s are attributed to the bearing poles. The complex-conjugate pair of "x" marks (located here at roughly −354±j354 are due to the low pass filter poles. Other "x" and "o" marks on the real axis are attributed to the PID controller and lead filter. Some curves of root locus tend toward the left-half plane of the plot, but the curves from the complex-conjugate poles move toward the right-half plane. As such, there is a "window" of loop gain values for which all of the closed-loop poles are in the left-half plane, yielding a stable system. The gain window is created by the bearing poles, located here at roughly ±417 rad/s and the low pass filter poles.

A root locus of a typical axial magnetic bearing system is shown in FIG. 2. The natural poles of the bearings themselves are shown on the real axis. When the loop is closed and the system loop gain is increased, the closed-loop pole that starts at the bearing pole in the positive half plane moves towards the left. When the closed-loop pole crosses the imaginary axis, the system stabilizes. Obviously, if the closed-loop pole starts closer to the imaginary axis, it will take a lower gain to stabilize the system.

At the same time, the low pass filter that is necessary to eliminate high frequency noise in the signal often creates a pair of complex-conjugate poles, one in the second quadrant and one in the third quadrant. When the control loop is closed and the loop gain increased, two closed-loop poles move from the low-pass filter poles towards the positive half plane. At some gain, the two closed-loop poles enter the positive half plane and the system becomes unstable. Thus, these two pairs of poles, the bearing poles and low pass filter poles, define a window of stable loop gain values. The gain must be large enough to move the positive closed-loop pole into the negative half plane but small enough to keep the complex-conjugate poles from crossing to the positive half plane. By moving the bearing poles closer to the origin, this window is enlarged, and the system becomes more stable.

Referring again to Equation 5, $\mu_0$ is a universal constant and A, m, and N are all constants of the system. That leaves only $d_g$ and $i_{bias}$ that can be varied. Therefore, by lowering $i_{bias}$, the poles can be brought closer to the imaginary axis, and the stability window is increased. It should be mentioned that decreasing the air gap will act to move the poles back out away from the origin, but the bias current is the dominant effect, as the air gap differential is on the order of a couple hundred $\mu$m while the bias current reduction is potentially as much as several amps.

When an external force is applied to the shaft, the current in one of the bearings increases while the current in the other decreases by the same amount. By moving the rotor closer to the bearing that sees the current increase, less current is necessary to produce the same amount of counter-force, as seen by Equation 3. As a result, the current in the opposing bearing decreases by less as well. Hence, the same force will cause less of a deviation in the bearing current. This allows for a lower bearing bias current without the danger of hitting the zero current region, which would result in non-linear control. Additionally, by lowering the bias current, and therefore the currents in both magnetic bearings, the total power consumption of the bearing system is decreased.

EXAMPLE 1

Figure 3:
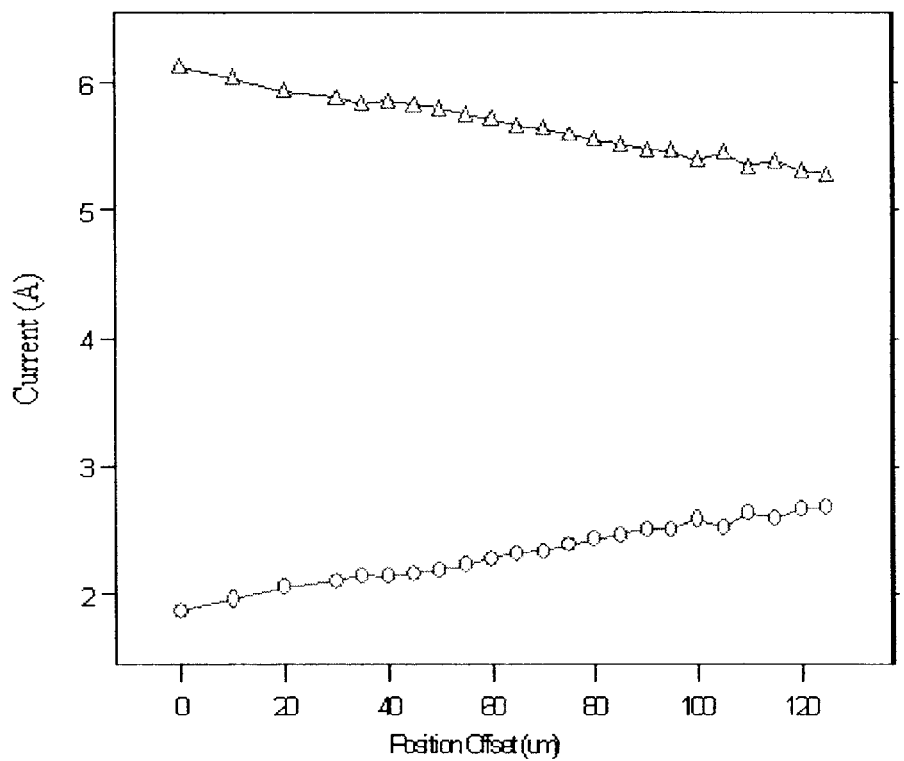
FIG. 3 contains data showing the current in the dual-magnet bearings as a function of air gap width. At 125 $\mu$m, the bias current could be reduced almost 2.5 A without ever zeroing out the overall bearing current. This would also reduce the other bearing's current to roughly 3 A.

The usefulness of this invention is shown in FIG. 3, which depicts a graph of the dual-magnet bearing currents with respect to the air gap width under a unidirectional steady-state load. At 125 μm, the bias current could be reduced almost 2.5 A without ever zeroing out the overall bearing current. This would also reduce the opposite bearing's current to roughly 3 A.

EXAMPLE 2

The variation of rotor position setpoint in a magnetic bearing can improve the stability of the system. For purposes of discussion and comparison, the width of the window is described in decibel (dB) units, where:

$$dB = 20 * \log_{10}\left[\frac{highest\_stable\_gain}{lowest\_stable\_gain}\right] \quad [8]$$

The data in example one was taken with a bias current of 4.0 Amps. This corresponds to a bearing pole placement of ±303.05 and a stability window of approximately 8 dB. After the air gap is moved 125 μm, we are able to reduce the bias current by 2 Amps, and this corresponds to a pole placement of ±220.52, including the correction for the new air gap width. The new stability window is approximately 18 dB. Therefore, the stability window is increased by 10 dB when the rotor is off center.

One of the presently preferred embodiment of the present invention is shown in FIG. 5. A RPM sensor 10 measures the speed of the rotor. The rotor speed is related to the amount of force seen by the bearings, and it is often measured as a series of pulses that is then fed into a frequency to voltage (FV) converter 11. The output 14 of the FV converter is then proportional to the rotational speed of the rotor. This voltage is then fed into a voltage divider 12. The voltage divider can be easily configured by anyone skilled in the art to output a voltage 13 proportional to the FV converter output and scaled properly to be used as the rotor position setpoint input voltage of the magnetic bearing controller 15 for a desired range of the setpoint.

Another preferred embodiment of the present invention would utilize a current sensor on the bearings in place of the RPM sensor 10 and a current to voltage converter in place of the FV converter 11. In such an embodiment, the smaller of the two bearing currents would be held above a certain value by moving the shaft back and forth.

A third preferred embodiment would be one that utilizes an aerodynamic, thermodynamic, hydrodynamic, or other system process variable as the means of determining the desired rotor position offset. One example of this would be the direct measure of a pressure at the inlet piping of a magnetic bearing centrifugal compressor system.

A fourth preferred embodiment would be one that uses a processor or data acquisition board to accept the RPM sensor 10 input or the current input, calculates a new setpoint through software, and outputs the proper rotor position setpoint voltage 13 to the controller 15.

It should also be noted that a processor could also be used to reduce the bias current in the windings at the same time that the shaft position is changed.

EXAMPLE 3

To summarize the entire scope of the invention, a complete example is now presented. Assume a magnetic bearing centrifugal compressor system with a pole face area of $2 \times 10^{-3}$ m$^2$, 100 turns of wire per magnet, a nominal air gap width of 500 μm, and a maximum bearing current of 12 A. According to Equation 4, the maximum force exerted per bearing is 3620.16 N, or 813.85 lb$_f$. A process which requires 900 lb$_f$ from one bearing at a shaft speed of 20,000 RPM will require then a new air gap of 475.47 μm. A typical voltage to position sensitivity for a controller and position sensor is 0.0197V/μm. Therefore, a total voltage of 0.483V is necessary to provide this offset at 20,000 RPM. This means that the FV converter and accompanying voltage divider must have a total combined FV gain of $24.16 \times 10^{-6}$ V/Hz.

EXAMPLE 4

Now assume that the system of Example 4 is to be redesigned to reduce the currents in the winding. With the above offset and specified force, the current will be mixed out at 12 A in the bearing providing the force. Assuming the bias current is 6 A, then the current in the opposing bearing is zeroed out. If the maximum bearing current is reduced from 12 A to 10.1 A, then the bias current can be reduced from 6 A to 5 A. As mentioned previously, it is undesirable to have one of the bearing currents zeroed out. Therefore, using a current of 10.1 A in one bearing and a bias current of 5 A will result in a current of 0.1 A in the opposing bearing. Equation 4 can be modified to account for both of the dual-set bearings the non-zero rotor position setpoint.

$$F_{dual\_bearing} = \frac{\mu_0 A N^2}{4}\left(\frac{i_1^2}{d_g^2} - \frac{i_2^2}{(1000 \times 10^{-6} - d_g)^2}\right) \quad [9]$$

where $i_1$ and $i_2$ are the currents in the closer and farther bearings, respectively. The factor of $1000 \times 10^{-6}$ is the total width of both halves of the air gap (500 μm times 2), and $d_g$ is again the air gap between the rotor and the bearing magnet that is exerting the principle force on the rotor. Substituting all values into the equation and solving for the air gap width, $d_g$, results in a new value of 400 μm for the air gap width. This also leads to an increase in the stability window as shown in Example 2. Therefore, by adjusting the rotor position setpoint a mere 100 μm, from an air gap width of 500 μm to 400 μm, more power is possible with lower current and greater stability. To implement this design, assuming the same rotor speed and position to voltage sensitivity of Example 4, the FV converter and accompanying voltage divider must have a total combined FV gain of $98.50 \times 10^{-6}$ V/Hz.

EXAMPLE 5

Consider a 100,000 RPM centrifugal compressor used in an oxygen generation system. A typical axial force requirement for this application is around 50 lb$_f$. This is accomplished with 75 turns per magnet, a maximum magnet current of 5 A, a pole face of $1.258 \times 10^{-3}$ m$^2$, and an air gap of 500 μm. If the output of the oxygen generator is to be increased, the rotor must spin faster At 110,000 RPM, the force requirement increases to 54 lb$_f$. To accomplish this, the air gap must be decreased to 481.47 μm. If the maximum current is then decreased to 4.75 A, and the bias current reduced to 1.9 A, the air gap must be further decreased to 450 μm. The stability window is then enlarged accordingly.

A further result is that the optimal run settings may have changed as well because the transfer function of the bearings have changed, resulting in poles placed differently from those given by Equation 5. The result is that adaptive control may be necessary to keep the system stable or at optimal running conditions.

Adaptive control may be required to re-optimize a linear controller after the rotor position setpoint has been changed. Adaptive control is a method known to those skilled in the art which can adjust control parameters automatically in such a way as to compensate for variations in the characteristics of the process it controls. In practice, this is a variation of linear control variables (e.g., gains and time and/or time constants) and filters. The optimal operational settings are likely not to be the optimal start-up settings.

EXAMPLE 6

Figure 4:
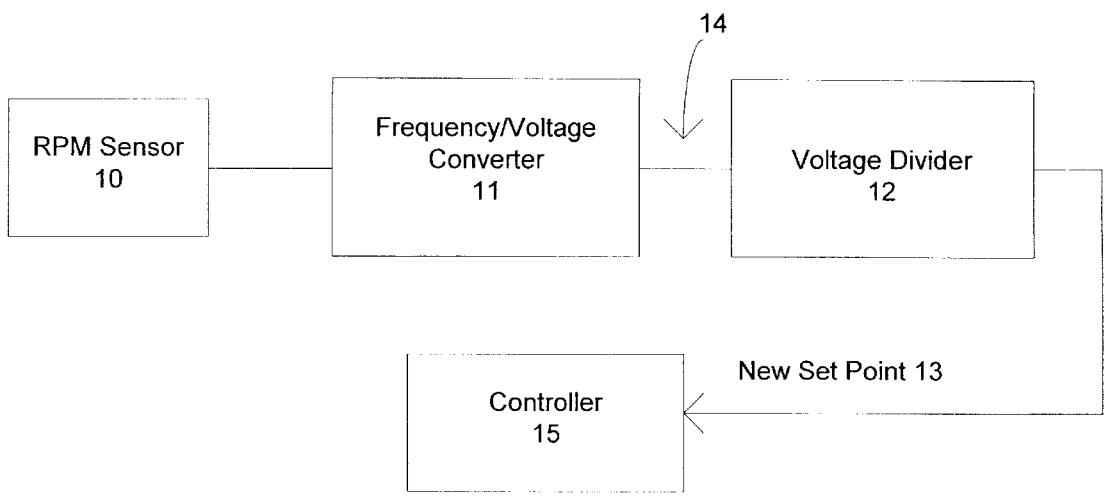
FIG. 4 is a schematic of one possible embodiment of the present invention.
Figure 6:
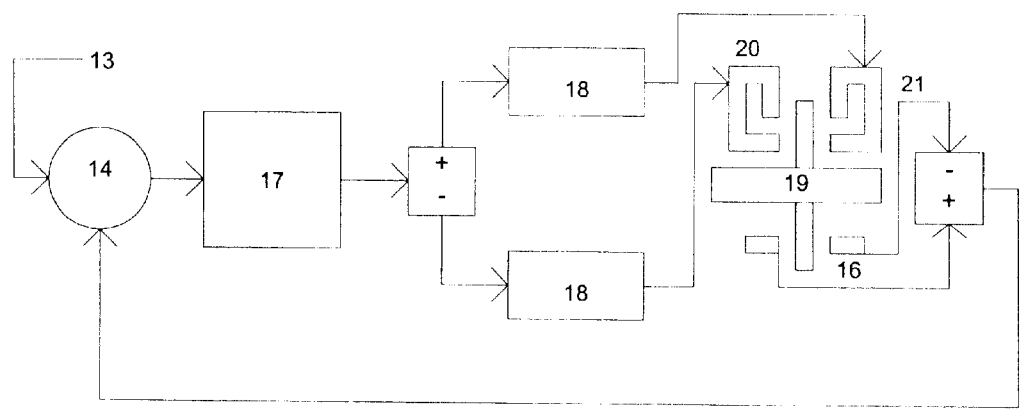
FIG. 6 is a schematic drawing of an embodiment of the present invention including an axial magnetic bearing.
Figure 7:
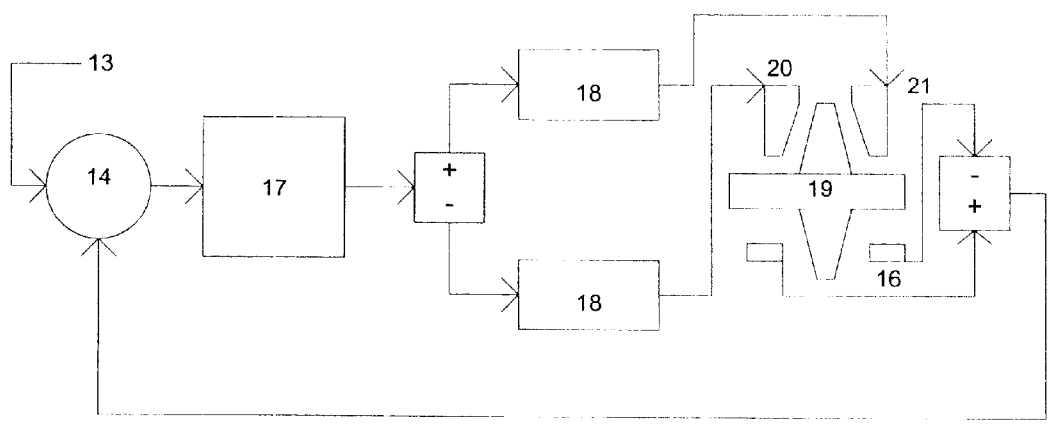
FIG. 7 is a schematic drawing of an embodiment of the present invention including a conical magnetic bearing.

Adaptive control as a result of offset is best illustrated by a third example shown in FIG. 4. The top plot in FIG. 4 shows a time plot of the position of an axial magnetic bearing in a centrifugal compressor spinning at 21,000 RPMs under a steady-state disturbance using a set of start-up settings. In this case, the axial position oscillation is approximately 40 $\mu$m off center. The bottom plot in shows the same disturbance using some example run settings. In this case, the oscillation has been improved to less than 20 $\mu$m. It should be noted that it is impossible to levitate the bearings stably using the run settings. Therefore, it is desirable for the bearings to start and run under different settings. The exact same theory would apply to radial or conical bearings as well.

There are two preferred embodiments for enacting an adaptive control technique. The first is to utilize a controller that iterates from the original settings to the final settings. This means that it changes each parameter that needs to be changed by very small increments in sequence until the final settings are reached. Each step of each iteration must be in a stable linear control region, or the system will cease to function correctly. A second technique is to simply shift between two setting registers so that all settings are changed simultaneously.

While the invention has been described in connection with currently preferred embodiments, procedures, and examples, it is to be understood that such detailed description was not intended to limit the invention on the described embodiments, procedures, and examples. Instead, it is the intent of the present invention to cover all alternatives, modifications, and equivalent which may be included within the spirit and scope of the invention as defined by the claims hereto.

What is claimed is:

1. A method of controlling a magnetic bearing system including two opposing magnetic bearings, a center, a rotor disposed between the two opposing magnetic bearings, and a rotor position setpoint, the method comprising keeping the setpoint closer to one of the magnetic bearings that has a higher current than it is to the other magnetic bearing.

2. The method of claim 1 wherein the magnetic bearing system includes at least two magnet pairs.

3. The method of claim 1, wherein the magnetic bearings are dynamically controlled, and the dynamically controlled magnetic bearings operate independently.

4. The method of claim 3 wherein the dynamic control is effected by an adaptive linear control algorithm having linear control algorithm parameters.

5. The method of claim 4 wherein the adaptive linear control algorithm parameters vary with the setpoint.

6. The method of claim 4 wherein the adaptive linear control algorithm is selected from the group consisting of PID, PI and PD.

7. The method of claim 1 wherein the magnetic bearing with a higher current is determined by a process variable selected from the group consisting of the rotor speed or frequency, the magnetic bearing current, a thermodynamic property of the system fluid, a hydrodynamic property of system fluid, an aerodynamic property of the system, and a system force.

8. The method of claim 1 further comprising varying a bias current in accordance with the change of the setpoint.

9. The method of claim 1 wherein the magnetic bearing system is installed in a centrifugal compressor.

10. The method of claim 1 wherein the magnetic bearing system is installed in high speed rotating equipment.

11. The method of claim 10 wherein the high speed rotating equipment is selected from the group consisting of a compressor, a blower, an expander, a motor, a turbine, and a gyroscope.

12. The method of claim 1 comprising keeping the setpoint as close as possible to the magnetic bearing that has a higher current while avoiding zero bearing current.

13. The method of claim 1 comprising varying the position of the setpoint so that the magnetic bearings exert a force on the rotor that is greater than a force that can be exerted by the magnetic bearings for the same magnetic bearing currents when the setpoint is at the center.

14. The method of claim 1 comprising varying the position of the setpoint so that magnetic bearing currents required to exert a force on the rotor is less than magnetic bearing currents required to exert the same force on the rotor when the setpoint is at the center.

15. The method of claim 1 comprising varying the position of the setpoint so that power consumed by the magnetic bearings to exert a given force on the rotor is less than power consumed by the magnetic bearings to exert the same given force on the rotor when the setpoint is at the center.

16. The method of claim 1 comprising varying the position of the setpoint to increase the range of system stability.

17. The method of claim 1 comprising varying the position of the setpoint to increase the range of linear operation.

18. The method of claim 1, wherein at least one of the magnetic bearings comprises a radial bearing.

19. The method of claim 1, wherein at least one of the magnetic bearings comprises an axial bearing.

20. The method of claim 1, wherein at least one of the magnetic bearings comprises a conical bearing.

21. A magnetic bearing system comprising:
    two opposing magnetic bearings;
    a center between the two magnetic bearings;
    a rotor disposed between the two opposing magnetic bearings;
    a rotor position setpoint; and
    a controller for controlling rotor position, wherein the controller is configured to keep the setpoint closer to one of the magnetic bearings that has a higher current than it is to the other magnetic bearing.

22. The system of claim 21 wherein the magnetic bearing with a higher current is determined by a process variable selected from the group consisting of the rotor speed or frequency, the magnetic bearing current, a thermodynamic property of the system fluid, a hydrodynamic property of system fluid, an aerodynamic property of the system, and a system force.

23. The system of claim 21 wherein the controller is configured to vary a bias current in accordance with the change of the setpoint.

24. The system of claim 21 wherein the controller uses an adaptive linear control algorithm having linear control algorithm parameters.

25. The system of claim 24 wherein the adaptive linear control algorithm parameters vary with the setpoint.

26. The system of claim 24 wherein the adaptive linear control algorithm is selected from the group consisting of PID, PI and PD.

27. The system of claim 21 wherein the controller is configured to keep the setpoint as close as possible to the magnetic bearing that has a higher current while avoiding zero bearing current.

28. The system of claim 21 wherein the controller is configured to vary the position of the setpoint so that the magnetic bearings exert a force on the rotor that is greater than a force that can be exerted by the magnetic bearings for the same magnetic bearing currents when the setpoint is at the center.

29. The system of claim 21 wherein the controller is configured to vary the position of the setpoint so that magnetic bearing currents required to exert a force on the rotor is less than magnetic bearing currents required to exert the same force on the rotor when the setpoint is at the center.

30. The system of claim 21 wherein the controller is configured to vary the position of the setpoint so that power consumed by the magnetic bearings to exert a given force on the rotor is less than power consumed by the magnetic bearings to exert the same given force on the rotor when the setpoint is at the center.

31. The system of claim 21 wherein the controller is configured to vary the position of the setpoint to maximize the range of system stability.

32. The system of claim 21, wherein at least one of the magnetic bearings comprises a radial bearing.

33. The system of claim 21, wherein at least one of the magnetic bearings comprises an axial bearing.

34. The system of claim 21, wherein at least one of the magnetic bearings comprises a conical bearing.

* * * * *